(12) United States Patent
Lee et al.

(10) Patent No.: US 8,441,229 B2
(45) Date of Patent: May 14, 2013

(54) SYSTEM FOR RECHARGING PLUG-IN HYBRID VEHICLE AND CONTROL METHOD FOR THE SAME

(75) Inventors: Jeong Yun Lee, Gyeonggi-Do (KR); Hong Seok Song, Gyeonggi-Do (KR); In Pil Yoo, Seoul (KR); Ki Young Jang, Gyeonggi-Do (KR); Sangcheol Shin, Gyeonggi-Do (KR); Jung Hong Joo, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 353 days.

(21) Appl. No.: 12/952,941

(22) Filed: Nov. 23, 2010

(65) Prior Publication Data
US 2012/0049803 A1    Mar. 1, 2012

(30) Foreign Application Priority Data
Aug. 31, 2010  (KR) .................. 10-2010-0085144

(51) Int. Cl.
*H01M 10/44* (2006.01)
*H01M 10/46* (2006.01)
(52) U.S. Cl.
USPC ............................................................. 320/104
(58) Field of Classification Search .............. 320/103, 320/104, 109, 123, 140; 290/19, 36 R, 46, 290/47; 903/902, 906, 907
See application file for complete search history.

(56) References Cited

U.S. PATENT DOCUMENTS

| 6,281,660 | B1 * | 8/2001 | Abe .................. 320/103 |
| 7,277,782 | B2 * | 10/2007 | Yakes et al. ............. 701/22 |
| 2010/0213896 | A1 * | 8/2010 | Ishii et al. ............. 320/109 |
| 2011/0127956 | A1 * | 6/2011 | Mitsutani ............. 320/109 |

FOREIGN PATENT DOCUMENTS

| JP | 08-126122 A | 5/1996 |
| JP | 2000-152408 A | 5/2000 |
| JP | 2000-232737 A | 8/2000 |
| KR | 10-2009-0062236 A | 6/2009 |
| KR | 10-2009-0062278 A | 6/2009 |

* cited by examiner

*Primary Examiner* — Edward Tso
(74) *Attorney, Agent, or Firm* — Edwards Wildman Palmer LLP; Peter F. Corless

(57) ABSTRACT

A system for recharging a plug-in hybrid vehicle and a control method are provided to recharge a battery with exterior AC electricity plugged in. The system includes a motor operated as an electric motor or a generator, a battery in which DC voltage is stored, an inverter disposed between the motor and the battery, a plugged in exterior AC electric power source supplying electrical energy, a single phase inductor disposed between the inverter and the AC electric power source, a switch which electrically connects or disconnects the motor, a current sensor that detects current value supplying to the motor, and a controller which controls the switch to disconnect electric connection between the inductor and the motor and controls the inverter not to supply current to the phase which is not connected to the inductor when the AC electric power source is plugged in.

4 Claims, 3 Drawing Sheets

SYSTEM FOR RECHARGING PLUG-IN HYBRID VEHICLE AND CONTROL METHOD FOR THE SAME

CROSS-REFERENCE TO RELATED APPLICATION

This application claims priority to and the benefit of Korean Patent Application No. 10-2010-0085144 filed in the Korean Intellectual Property Office on Aug. 31, 2010, the entire contents of which are incorporated herein by reference.

BACKGROUND OF THE INVENTION (a) Field of the Invention

The present invention relates to a plug-in hybrid vehicle, and more particularly to a system for recharging a plug-in hybrid vehicle which recharges a battery with plugged-in exterior AC electricity, and a control method for recharging the plug-in hybrid vehicle.

(b) Description of the Related Art

In order to meet tightened exhaust gas regulations on vehicles and to enhance fuel consumption, hybrid vehicles have been developed.

A hybrid vehicle generates electricity through regenerative braking by which a motor rotates inversely in a case of deceleration and recharges a battery. In addition, hybrid vehicles can enhance fuel consumption and reduce exhaust gases through ISG (Idle Stop and Go) control where an engine is stopped when the vehicle stops and the engine is restarted by using the motor when the vehicle begins to run.

FIG. 3 (PRIOR ART) is a circuit diagram depicting a system for recharging a plug-in hybrid vehicle according to a conventional art.

Referring to FIG. 3, a charging system of a conventional plug-in hybrid vehicle includes a circuit having a motor 1, a battery 2, and an inverter 3 disposed between the motor 1 and the battery 2. Further, a charger 5 in parallel with a DC link of the battery 2 can be connected with plugged-in exterior AC electricity 4. The charger 5 includes a plurality of inverter elements and is equipped to a hybrid vehicle.

In operation, when commercial AC electricity is connected to the charger 5, the charger 5 switches inverter elements, converts the plugged AC voltage into DC voltage and recharges the battery 2. In this case, the inductor 3 disposed between the battery 2 and the motor 1 is switched to off.

However, use of an on-board charger is undesirable, because it can be expensive and heavy, which may increase manufacturing costs of the hybrid vehicle and reduce fuel efficiency of the hybrid vehicle.

In addition, since the charger may require mounting in a limited space, it can be difficult to manufacture the charger as a package.

Particularly, since the on-board charger may cost about ten times more than an inverter producing the same output, use of such a charger can be undesirable.

The above information disclosed in this Background section is only for enhancement of understanding of the background of the invention and therefore it may contain information that does not form the prior art that is already known in this country to a person of ordinary skill in the art.

SUMMARY OF THE INVENTION

In one aspect, the present invention provides a system for recharging a plug-in hybrid vehicle that is configured to recharge a battery with plugged-in exterior AC electricity using an inverter, without requiring a charger.

A system for recharging a plug-in hybrid vehicle according to an exemplary embodiment of the present invention preferably includes a motor operated as an electric motor or a generator, a battery in which DC voltage is stored for powering the motor, an inverter disposed between the motor and the battery, a plugged in exterior AC electric power source supplying electrical energy, a single phase inductor disposed between the inverter and the AC electric power source by a first power cable connecting the inverter and the motor, a switch which electrically connects or disconnects the motor with a junction of the first power cable, a current sensor which is connected to a second power cable, which is not connected to the exterior AC electric power source, and detects a current value supplying to the motor, and a controller which controls the switch to disconnect electric connection between the inductor and the motor and for controlling the inverter not to supply current to the second power cable when the AC electric power source is plugged in.

When the AC electric power source is plugged in, the controller may detect current of the second power cable, and the controller may control the inverter to control the current value of the second power cable, which is not connected to the exterior power source, flowing to the motor to zero according to control of a PI Controller (proportional-integral controller).

The controller may include a calculator for calculating a current value difference between a current command and the current value detected from the current sensor, a PI Controller for calculating a compensation current value corresponding to the calculated current value difference of the calculator, and an inverter controller which controls the current valve of the second power cable, disconnected to the exterior electric power source, to zero by controlling a relevant arm according to the calculated compensation current value of the PI Controller, and the inverter controller which operates charging of the battery by controlling the other two arms to convert the AC electric power source into DC voltage.

A control method for recharging a plug-in hybrid vehicle according to an exemplary embodiment of the present invention, the control method may include detecting an exterior AC electric power source that is plugged in for charging, opening one power cable of two power cables connecting the exterior AC electric power source and a motor so as to disconnect electric connection between the disconnected power cable and the motor, detecting current value of the other power cable, which is not connected to the exterior AC electric power source, calculating a compensation current value by PI Control, and controlling switching of an inverter to maintain the current flowing from the power cable disconnected from the exterior AC electric power source into the motor to zero value, and charging the battery with the exterior AC electric power source by controlling switching of the inverter to the other of the two power cables connected to the exterior AC electric power source.

According to the exemplary embodiment of the present invention, since the system may charge a battery using an inverter equipped to a vehicle without an expensive charger, manufacturing costs of the hybrid vehicle may be reduced.

Also, it is possible to enhance volume efficiency and improve fuel efficiency of the hybrid vehicle.

<Description of symbols>

Figure 1:
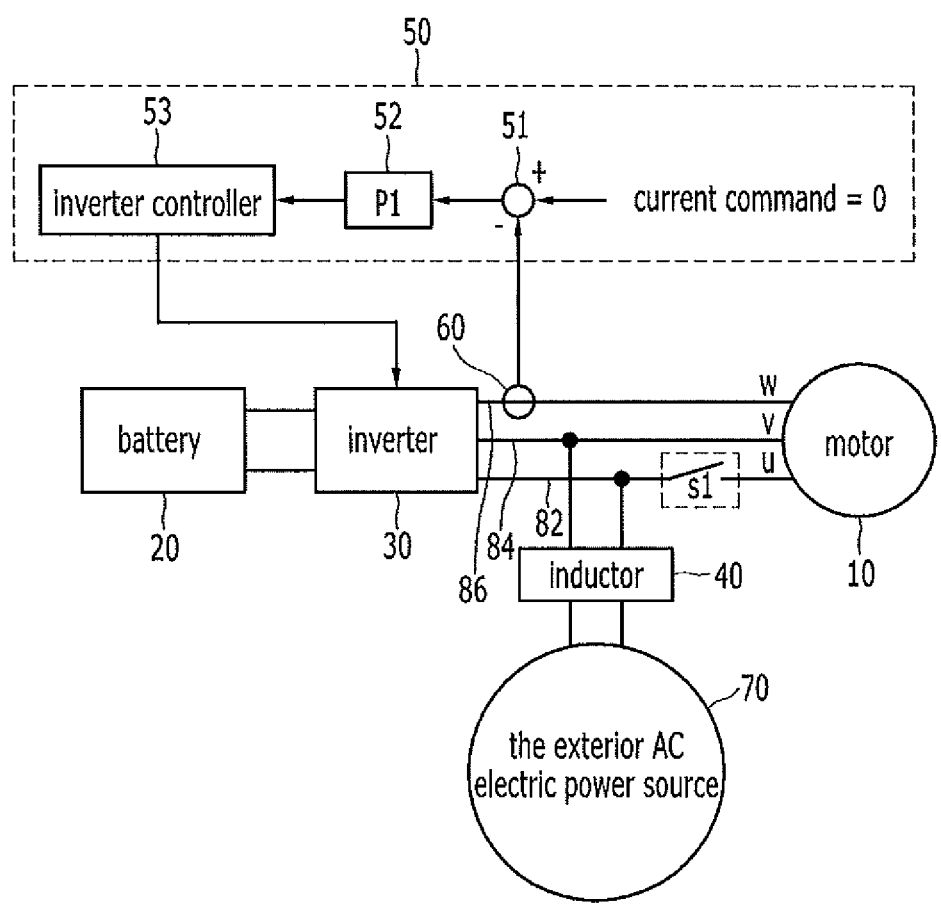
FIG. 1 is a schematic view of a system for recharging a plug-in hybrid vehicle according to an exemplary embodiment of the present invention.

| | |
|---|---|
| 10: | motor |
| 20: | battery |
| 30: | inverter |
| 40: | inductor |
| 50: | controller |
| 60: | current sensor |

DETAILED DESCRIPTION OF PREFERRED EMBODIMENTS

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is a schematic view of a system for recharging a plug-in hybrid vehicle according to an exemplary embodiment of the present invention.

Referring to FIG. 1, a system for recharging a plug-in hybrid vehicle preferably includes a motor 10, a battery 20, an inverter 30, an inductor 40, a controller 50, a switch S1, and a current sensor 60.

The motor 10 preferably is a 3-phase AC electric motor, which can be derived by 3-phase AC voltage supplied from the inverter 30. The motor 10 is operated as an electric motor which can drive a wheel (not shown), and is selectively operated as a generator in regeneration.

The motor 10 preferably includes a 3-phase stator coil, and U, V, and W phase coils forming the 3-phase stator coil each are respectively provided with one end interconnected so as to form a neutral point and the other end connected to a corresponding arm of the inverter 30.

The battery 20 preferably is powered by DC electricity. For example, one of nickel-hydrogen and lithium-ion rechargeable battery and a capacitor of large capacity may be used as the battery 20. The battery 20 preferably stores DC voltage for driving the motor 10.

In addition, the battery 20 can be recharged by exterior commercial electricity 70 which is raised or lowered by the converter 30 and is applied to the battery 20.

The inverter 30 is formed by connecting electric switching elements in series, and includes U phase arms Sau and Sau', V phase arms Sav and Sav', and W phase arms Saw and Saw'.

One of an NPN transistor, an IGBT (Insulated Gate Bipolar Transistor), and an MOSFET may be used as the electric switching element.

The inverter 30 preferably converts the DC voltage of the battery 20 into the 3-phase AC voltage according to a PWM signal applied from an inverter controller 53 to each arm, and supplies the 3-phase AC voltage to the motor 10 as a driving voltage.

Since the inductor 40 is disposed between the inverter 30 and the exterior AC electric power source, parallel connection of the electric power sources may be avoided.

The inverter 30 and the motor 10 are connected through power cables 82, 84 and 86, and the inductor 40 is disposed between the inverter 30 and the exterior AC electric power source, which is connected to the power cables 82 and 84. As used herein, the power cables 82, 84, and 86 can be referred to as first, second, and third power cables in any order, depending on how the respective power cables are connected.

The controller 50 controls insulation between the exterior AC electric power source and the motor 10, and controls recharging of the battery 20 when the exterior AC electric power source is plugged in.

When the exterior AC electric power source is plugged in, the controller 50 opens the switch S1, which is disposed on one of the power cables 82 and 84 connected to the exterior AC electric power source, and thus connection between the exterior AC electric power source and the motor 10 is physically disconnected.

On the two power cables 82 and 84, of which the inverter 30, the motor 10 and the inductor 40 are connected, two junctions a and b are formed respectively, and on the junctions, for example, currents having "u" phase and "v" phase flow respectively.

The switch S1, for example, is disposed on the cable 82, of which current having "u" phase flows.

When the AC electric power source 70 is plugged in, the controller 50 detects a current of the power cable, for example, the power cable 86 which is not connected to the exterior power source 70, by using the current sensor 60, and the controller 50 controls the inverter 30 to control the current value of the power cable 86 flowing to the motor 10 to zero under the control of a PI Controller (proportional-integral controller).

For example, current flowing through the power cable 86, which is not connected to the exterior power source 70, has "w" phase.

The controller 50 includes a calculator 51, a PI Controller 52 and the inverter controller 53, for example a PWM generator (Pulse Width Modulation; 53).

The calculator 51 calculates the current value difference between current command (for example "zero command") and the current value, which is not connected to the exterior power source 70 (for example "w" phase), detected from the current sensor 60.

The PI Controller 52 calculates a compensation current value corresponding to the calculated current value difference of the calculator 51 for maintaining "zero" current.

The inverter controller 53 (the PWM generator) controls the current valve of the power cable 86, which is disconnected from the exterior electric power source 70, to zero by controlling a relevant arm according to the calculated compensation current value of the PI Controller 52, and the inverter controller 53 operates charging of the battery 20 by controlling the other two arms to convert the AC electric power source 70 into DC voltage.

The exterior electric power source 70 may be a source of commercial electricity and have a single phase.

Alternatively, the exterior electric power source 70 may be a source of AC electricity. Further, DC electricity may be used.

The switch S1 is disposed on one power cable 82 (of two power cables 82 and 84 which are connected to the exterior electric power source 70), for example, related to current having "u" phase, and is opened when the exterior AC electric power source is plugged in. And thus, for example, the exterior electric power source 70 and the motor 10 are opened to "u" phase.

The current sensor 60 is disposed on one power cable 86 (of the three power cables 82, 84 and 86), for example, the power cable 86 of which the current having "w" phase, and detects current value.

Hereinafter, a control method for the system for recharging plug-in hybrid is vehicle according to an exemplary embodiment of the present invention will be described.

Figure 2:
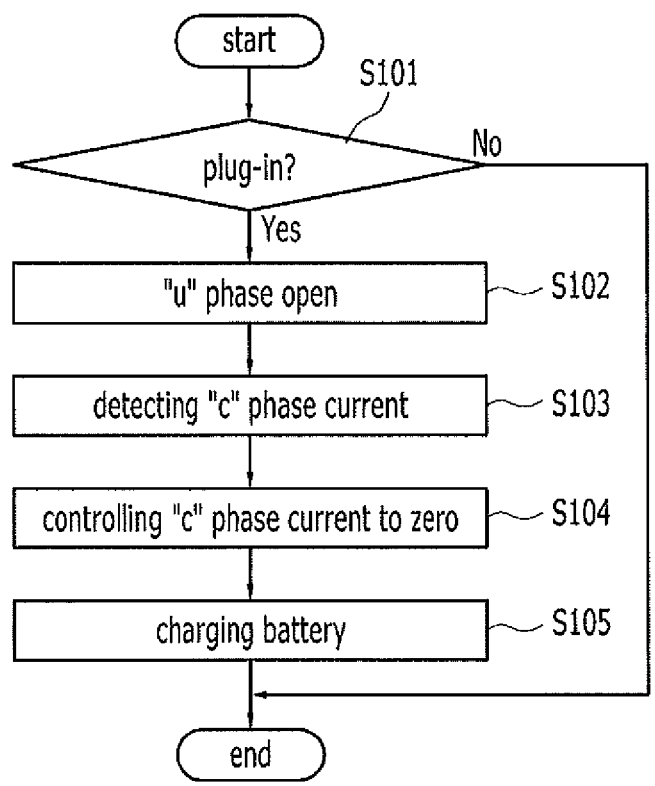
FIG. 2 is a flowchart showing a system for recharging the plug-in hybrid vehicle according to an exemplary embodiment of the present invention.
Figure 3:
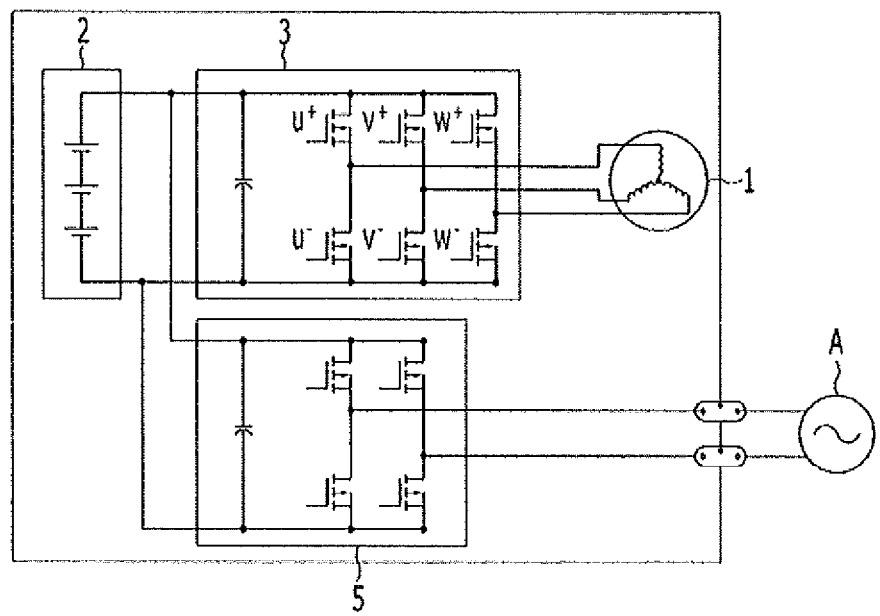
FIG. 3 (PRIOR ART) is a circuit diagram of a system for recharging a plug-in hybrid vehicle according to a conventional art.

FIG. 2 is a flowchart showing a system for recharging a plug-in hybrid vehicle according to an exemplary embodiment of the present invention.

The controller 50 applied to the present invention detects if the exterior AC electric power source 70 is plugged in for recharging the battery 20 (S101).

When the exterior AC electric power source 70 is plugged in, the controller 50 controls the switch S1 to be opened so as to disconnect electric connection among the motor 10, the exterior AC electric power source 70, and the power cable 82 (for example "u" phase current flows) (S102).

The current sensor 60 detects a current value of the power cable 86, which is not connected to the exterior AC electric power source 70 (S103), and a compensation current value is calculated by PI Control. Also, the inverter 30 is controlled to maintain the current flowing from the power cable 86 disconnected from the exterior AC electric power source 70 into the motor 10 to zero value for the motor 10 to be un-operated (S104).

The calculator 51 provided to the controller 50 calculates the current value difference between a current command (for example, "zero command") and the current value, which is not connected to the exterior power source 70 (for example, "w" phase), detected from the current sensor 60 and the calculator 51 transmits to the PI Controller 52.

The PI Controller 52 calculates a compensation current value corresponding to the calculated current value difference of the calculator 51 for maintaining "zero" current, and then transmits the difference to the inverter controller 53 (the PWM generator).

Subsequently, the PWM generator 53 controls "w" phase arm of the inverter 30 and maintains the current having "w" phase to zero, and thus the current having "v" phase does not flow.

That is, the current having "u" phase is in an opened state, the current having "w" phase is zero, and also the current having "v" phase has no value, so that the exterior power source 70 and the motor 10 are insulated.

Next, the PWM generator 53 of the controller 50 controls PWM switching control of two arms of the inverter 30, connected to "u" phase and "v" phase, so that the battery 20 is charged with the exterior AC electric power source 70 (S105).

According to the exemplary embodiment of the present, since the system may charge the battery using the inverter equipped to a vehicle without an expensive charger, manufacturing costs of the hybrid vehicle may be reduced. Also, it is possible to enhance volume efficiency and improve fuel efficiency of the hybrid vehicle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for recharging a plug-in hybrid vehicle comprising:
   a motor operated as an electric motor or a generator;
   a battery in which DC voltage is stored for powering the motor;
   an inverter disposed between the motor and the battery;
   a plugged-in exterior AC electric power source for supplying electrical energy;
   a single phase inductor disposed between the inverter and the AC electric power source by a first power cable connecting the inverter and the motor;
   a switch which electrically connects or disconnects the motor by a junction formed on the first power cable connecting the inverter, the motor and the inductor;
   a current sensor which is connected to a second power cable, which is not connected to the exterior AC electric power source, and detects a current value being supplied to the motor; and
   a controller which controls the switch to disconnect electric connection between the inductor and the motor, wherein the controller controls the inverter so as not to supply current to the second power cable which is not connected to the inductor when the AC electric power source is plugged in.

2. The system of claim 1, wherein when the AC electric power source is plugged in, the controller detects the current of the second power cable which is not connected to the exterior power source with the current sensor, and the controller controls the inverter to control the current value of the power cable, which is not connected to the exterior power source, flowing to the motor to zero according to control of a PI Controller (proportional-integral controller).

3. The system of claim 1, wherein the controller comprises:
   a calculator for calculating a current value difference between current command and the current value detected from the current sensor;
   a PI Controller for calculating a compensation current value corresponding to the calculated current value difference of the calculator; and
   an inverter controller which controls the current valve of the second power cable, disconnected from the exterior electric power source, to zero by controlling a relevant arm according to the calculated compensation current value of the PI Controller, wherein the inverter controller charges the battery by controlling the other two arms to convert the AC electric power source into DC voltage.

4. A control method for recharging a plug-in hybrid vehicle, the control method comprising:
   detecting whether an exterior AC electric power source is plugged in for charging;
   disconnecting one power cable of two power cables connecting the exterior AC electric power source and a motor so as to disconnect electric connection between the one power cable and the motor;

detecting a current value of the disconnected power cable, calculating a compensation current value by PI Control, and controlling switching of an inverter to maintain the current flowing from the power cable disconnected from the exterior AC electric power source into the motor to zero value; and charging the battery with the exterior AC electric power source by controlling switching of the inverter to the other of the two power cables connected to exterior AC electric power source.

* * * * *